United States Patent
Lildholdt et al.

(10) Patent No.: US 9,933,101 B2
(45) Date of Patent: Apr. 3, 2018

(54) VALVE HOUSING WITH A SPINDLE GUIDE AND METHOD FOR PRODUCTION THEREOF

(71) Applicant: BROEN A/S, Assens (DK)

(72) Inventors: Mads Lindegaard Lildholdt, Haarby (DK); Lars Andersen, Hamdrup (DK); Lars Linaa Jørgensen, København S (DK); Peder Madsen, Odense SV (DK)

(73) Assignee: BROEN A/S, Assens (DK)

( * ) Notice: Subject to any disclaimer, the term of this patent is extended or adjusted under 35 U.S.C. 154(b) by 40 days.

(21) Appl. No.: 14/917,359

(22) PCT Filed: Sep. 8, 2014

(86) PCT No.: PCT/DK2014/050275
§ 371 (c)(1),
(2) Date: Mar. 8, 2016

(87) PCT Pub. No.: WO2015/032415
PCT Pub. Date: Mar. 12, 2015

(65) Prior Publication Data
US 2016/0215915 A1    Jul. 28, 2016

(30) Foreign Application Priority Data
Sep. 9, 2013   (DK) .................................. 2013 70502

(51) Int. Cl.
*F16L 55/105*    (2006.01)
*F16K 27/02*    (2006.01)
(Continued)

(52) U.S. Cl.
CPC ............ *F16L 55/105* (2013.01); *F16K 27/02* (2013.01); *F16K 27/067* (2013.01); *F16K 27/08* (2013.01); *F16K 27/107* (2013.01)

(58) Field of Classification Search
CPC ...... F16K 5/0657; F16K 27/067; F16K 27/02; F16L 55/105
See application file for complete search history.

(56) References Cited

U.S. PATENT DOCUMENTS 500,941 A    7/1893   Perkins
548,779 A   10/1895   Doyle
(Continued)

FOREIGN PATENT DOCUMENTS

CN    201982790 U    9/2011
CN    102808980 A   12/2012
(Continued)

*Primary Examiner* — Kevin Lee
(74) *Attorney, Agent, or Firm* — David S. Safran

(57) ABSTRACT

A valve and a method for making the valve, the valve including a valve housing with a central part and with two connection ends, wherein internally of the central part there is arranged a valve body in a valve seat and connected to a valve spindle that is arranged in a spindle guide stub on the valve housing. The method includes a tubular workpiece being provided with a cutout, a plate-shaped workpiece being provided that is plastically deformed to form a collar on it whereby a spindle guide stub is formed with a collar along its lower edge and a cutout in its upper surface. The spindle guide stub is laser welded on the tubular workpiece providing an internal welding seam running along the edge of the inner opening in the collar of the spindle guide stub, along the cutout and at the outer side of the tubular workpiece.

13 Claims, 4 Drawing Sheets

(51) Int. Cl.
*F16K 27/06* (2006.01)
*F16K 27/08* (2006.01)
*F16K 27/10* (2006.01)

(56) References Cited

U.S. PATENT DOCUMENTS

| | | |
|---|---|---|
| 1,872,357 A | 8/1932 | Straty |
| 1,966,403 A | 7/1934 | Durham |
| 2,228,857 A | 1/1941 | Stephenson |
| 3,490,734 A | 1/1970 | Freeman |
| 4,545,231 A | 10/1985 | Connolly et al. |
| 5,104,155 A | 4/1992 | Kirkwood |
| 6,431,520 B1 | 8/2002 | Ferrer Beltran |
| 7,980,531 B2 * | 7/2011 | Myhrberg et al. .... F16K 41/103 251/214 |
| 2009/0224025 A1 | 9/2009 | Bucher et al. |
| 2015/0219235 A1 * | 8/2015 | Lildholdt et al. ..... F16K 27/067 251/304 |
| 2016/0298776 A1 * | 10/2016 | Lildholdt et al. ..... F16K 5/0689 |

FOREIGN PATENT DOCUMENTS

| | | |
|---|---|---|
| DE | 25 34 663 A1 | 2/1977 |
| DE | 35 03 030 A1 | 7/1986 |
| DE | 199 45 960 A1 | 4/2000 |
| DE | 101 02 593 A1 | 5/2002 |
| EP | 0 123 185 B1 | 5/1987 |
| EP | 1 323 965 A1 | 7/2003 |
| FR | 1 296 084 A | 6/1962 |
| JP | 04-032369 A | 2/1992 |
| JP | H09-53732 A | 2/1997 |
| KR | 10-0265250 B1 | 6/2001 |
| WO | 2014/026691 A1 | 2/2014 |

\* cited by examiner

VALVE HOUSING WITH A SPINDLE GUIDE AND METHOD FOR PRODUCTION THEREOF

BACKGROUND OF THE INVENTION

Field of the Invention

The present invention concerns a method for making a valve for regulating a fluid, the valve including a valve housing with a central part and with one, two or more connection ends, the connection ends extending away from the central part, wherein internally of the central part there is arranged a valve body, for example with a through-going opening, the valve body arranged in a valve seat and connected to a valve spindle, the valve spindle arranged in a spindle guide stub on the valve housing.

The invention furthermore concerns a valve for regulating a fluid, the valve including a valve housing with a central part and with one, two or more connection ends, the connection ends extending away from the central part, wherein internally of the central part there is arranged a valve body, for example with a through-going opening, the valve body arranged in a valve seat and connected to a valve spindle, the valve spindle arranged in a spindle guide stub on the valve housing.

Description of Related Art

It is commonly known to make valves, e.g., ball valves, and thereby valve housings of several parts and then assemble these parts around a valve seat and a valve body. Such valves are typically made of brass or other cupper-based alloy and are typically assembled by corresponding screw threads in respective parts, or alternatively by means of bolts. The spindle guide stub will typically be mounted with a threaded joint or by a welding on the valve housing itself.

When speaking of a ball valve, the valve body is, as indicated by the name, spherical and with an outer size which is greater than the connecting openings in the valve housing. Such a valve therefore has a valve housing with an internal geometry in which valve seat and valve body are disposed. The valve housing is typically joined in the vicinity of the valve body as the latter requires the largest internal dimension. Such valves are typically made of cast workpieces which are formed and shaped by machining into the desired geometry. This shaping process is, however, rather cost-intensive for several reasons. The individual workpieces are to be cast and then handled and machined one by one in a suitable metal cutting unit. Since the workpieces are individually machined, the process is time-consuming, irrespective of the application of modern and rapid processes.

In addition to the handling and machining of the cast workpieces prior to assembling around a valve seat and a valve body, the cost of the material also plays a significant role. Brass or other suitable alloys are expensive and imply an appreciably greater cost than, e.g., common weldable carbon steel.

German Patent Application DE 3503030 A1 discloses a valve that comprises a valve housing with a central part and with two or more connection ends, the connection ends extending away from the central part, and where internally of the central part there is arranged a valve body arranged in a valve seat and connected to a valve spindle. The valve spindle is arranged in a spindle guide stub on the valve housing, which is made of a tubular workpiece and includes a spindle guide stub, the spindle guide stub being welded on the tubular workpiece in a traditional way.

There is thus an expressed desire for making valves for heating and cooling systems, for potable water and for other purposes in steel, e.g., carbon steel or stainless steel which is cheaper and which can be worked with modern production equipment directly from a plate piece or a tube piece faster and cheaper than possible when casting and machining workpieces of brass.

At the same time, it is greatly desired to perform as few welding processes as possible on a valve as such processes cause the work pieces to be set up at least one more time and as a welding process is to be performed, which of course raise the cost of the product.

Finally, crevice corrosion can arise in cavities between two surfaces in a joint, e.g., in threaded joints, which may cause a substantially shortened service life of the valves so that they have to be removed from the system due to the crevice corrosion. Therefore, it is also greatly desired to avoid such joints between the valve parts where there is a risk that crevice corrosion will occur.

SUMMARY OF THE INVENTION

It is the object of the invention to indicate a solution to the above problem wherein a valve housing can be made of a tubular workpiece, wherein a minimum number of chip removing and cutting processes are performed before mounting a valve seat and a valve body, and therefore is cheaper and which can be worked directly from a plate workpiece or a tubular workpiece with modern production equipment.

It is also an object that the making of the parts of the valve housing prior to the mounting itself of valve seat and valve body is preferably performed before final shaping of the valve housing itself.

Finally, it is an object of the invention to provide a valve with a valve housing where the risk of crevice corrosion at the joint between the spindle guide stub and the valve housing can be avoided completely, or at least reduced considerably.

According to the present invention, this is achieved by a method of making a valve at least including that a plate-shaped workpiece is provided, that a plastic deformation of the plate-shaped workpiece in the form of a collaring on the plate-shaped workpiece is performed whereby a spindle guide stub is formed, as the spindle guide stub has a collar along its lower edge and a cutout at the upper end which has an edge face with a shape such that the edge face on the spindle guide stub forms an opening with arresting faces at the outer end of the spindle guide stub.

The object of the invention is thus also achieved by a valve with a valve housing made from a tubular workpiece, and which includes a plastically deformed, collared spindle guide stub with a collar along its lower end and an opening at its upper end, as the spindle guide stub is welded on tubular workpiece by a welding, such as a welding around the cutout in the tubular workpiece such that there is provided an internal welding seam running along the edge of the inner opening in the collar of the spindle guide stub and along the cutout and at the outer side of the tubular workpiece.

In an embodiment of the method according to the invention, it is preferred that the plate-shaped workpiece is plane prior to shaping and is provided a saddle-shape simultaneously with the forming of the spindle guide stub by collaring. This can be done in a simple way in that the blank holder and the draw ring in the deep drawing tool are provided with a groove and a bead, respectively, with a shape as a part of a cylinder so that the plane workpiece, the metal disc, becomes saddle-shaped with a curved shape at the bottom side of the collar of the spindle guide stub corresponding to the curvature at the outer side of the tubular workpiece. The shaping of the spindle guide stub is thereby performed with the lowest possible costs. Alternatively, the plate-shaped workpiece can have saddle-shape before the shaping operation.

The method according to the invention includes that there is provided a tubular workpiece with a cutout in the tubular workpiece, and that the collared spindle guide stub is welded on the tubular workpiece. Welding is, e.g., a conventional welding or preferably a laser welding around the cutout in the tubular item. By the welding is provided an internal welding seam running along the edge of the inner opening in the collar of the spindle guide stub and along the cutout and at the outer side of the tubular workpiece.

By mounting the spindle guide stub such that the welding seam will run along the inner edge of opening between the spindle guide stub and at the outer side of the tubular workpiece and along the cutout therein, the welding seam will cover the gap arising between the spindle guide stub collar and the outer side face of the valve housing itself. It is thereby avoided that fluid, most often a liquid or a gas, can penetrate into the gap and contribute to crevice corrosion. At the same time, this way of mounting the spindle guide stub on the valve housing is rapid, and it is easy to automate the welding process, e.g., by robots, such that it is made uniformly and accurately on all valves. Moreover, this possibility of automating the mounting of the spindle guide stub will result in significantly lower production costs per valve unit. By using laser welding, this welding seam can be laid particularly accurately at the gap between the stub collar and the outer side face of the valve housing, thereby reducing uncertainties in the position of the welding seam, and thereby further reducing the risk of crevice corrosion.

A method for producing a valve according to the invention can include that the tubular workpiece is provided by deep drawing or a corresponding process where e.g., a plate piece is worked by deformation into having a more or less tubular shape.

Alternatively, a method for producing a valve according to the invention can be so that the tubular item is provided by shortening a prefabricated tube piece with the desired dimensions.

Depending on material properties and the most advantageous production methods with regard to cost as well as with regard to tolerances or surface quality, there is a free choice between the said methods which each have their own specific advantages.

Common to the said methods is that hereby can be produced a valve housing which is only constituted by a single item formed in one piece without any kind of joining by welding, bolting or similar joining methods.

A method for producing a valve according to the invention can include that the valve spindle is mounted in the spindle guide stub before welding thereof on the tubular workpiece. Thereby is enabled that by the deep drawing a collar is formed on the spindle guide stub, contributing to keeping to the valve spindle in position in the valve spindle stub, and that the valve spindle is retained thereby in the spindle guide stub without use of a stopper or similar which is normally fastened to the spindle guide stub with a screw thread. This will provide that cutting a screw thread in the spindle guide stub is avoided, meaning that the costs of making the valve are further reduced.

When the spindle guide stub is mounted in the spindle guide stub while using one or more packings, the spindle is kept in position at the same time during the subsequent method steps. Furthermore, the packings ensure that the valve is dry in the spindle stub afterwards, and finally the risk of the spindle dropping out during the subsequent mounting steps is reduced.

In an embodiment of the valve, the opening at the upper end of the spindle guide stub includes one or more arresting faces that limit rotation of the spindle in the spindle guide stub. By designing the cutout, i.e., the opening, in the disc with e.g., the shown shape prior to deep drawing, these arresting or stop faces will automatically appear in the opening of the spindle guide stub during deep drawing of the spindle guide stub.

In a further embodiment of the valve, the valve housing further includes one or more collared stubs, which are preferably suited for mounting one or more sensors, and/or which can be connected to equipment for leak testing the valve. Such a sensor can be, e.g., a temperature sensor, a pressure sensor or another kind of sensor.

By the method, it is preferred that valve body and valve seats are placed in the valve housing before the final shaping of the ends of the tubular workpiece for forming the ends of the valve housing, since it is thereby possible to form the valve housing with ends with reduced diameter relative to the central part where valve seat and valve bodies are disposed.

A valve including a valve housing according to the invention is typically designed such that the connection ends have an inner diameter which substantially corresponds to the inner diameter of the valve body. This is therefore a so-called fullflow valve which advantageously can be used in many places where there is a need for a more unhindered flow in the medium flowing through the valve. The connection ends on the valve housing can be designed according to need and can be with male ends as well as female ends and include all thinkable types of couplings for connecting pipes or hoses, including couplings of the press-fit type.

At the time being, thinwalled materials gain a foothold in the industry and are increasingly applied to industrial solutions as well as to plumbing installations in residential buildings. There are innumerable advantages connected with thinwalled pipes and fittings and the jointing methods are very simple whereby time-consuming and cost-raising work of threading, welding or soldering is avoided.

A valve housing according to the invention can advantageously be made of a thinwalled material, such as untreated or surface treated carbon steel or stainless steel, where the valve housing and/or the spindle guide stub are/is formed by plastic deformation of the material, e.g., by hydraulic shaping or by axial shaping or by another suitable process. Particularly hydraulic shaping and axial shaping have appeared to be very well suited for making a valve housing as such processes are rapid and cheap compared with traditional production methods for valve housings, which are typically made of sintered, cast or forged brass or other suitable material which is machined afterwards and fitted with a valve insert. Furthermore, hydraulic shaping and axial shaping are very accurate shaping methods and good tolerances can be attained. Alternatively, the ends of the valve housing are shaped under heating, e.g., by induction, as the central part of the valve housing where valve body, valve seat and possible packings are disposed are kept cool during the shaping procedure such that the internal parts of the valve such as packings, valve body and seats are not damaged by the thermal action during the heating of the ends of the valve housing, and possibly completed by an annealing of the ends of the valve housing, e.g., under a protecting atmosphere.

By this method, the valve can be made of e.g., untreated steel in a series of contiguous and automated processes, and after mounting the production can be completed with a surface finishing. Such a valve and method for producing a valve is very advantageous as the process is simple, takes place in a straightforward sequence and is completed with finishing of the surface.

In a preferred variant of the invention, the valve housing may advantageously be made of, e.g., stainless steel. Hereby is achieved the obvious advantage that surface treatment of the valve housing is no longer necessary, entailing a lower production cost of the finished product.

The invention will now be explained below with reference to the accompanying drawings.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1:
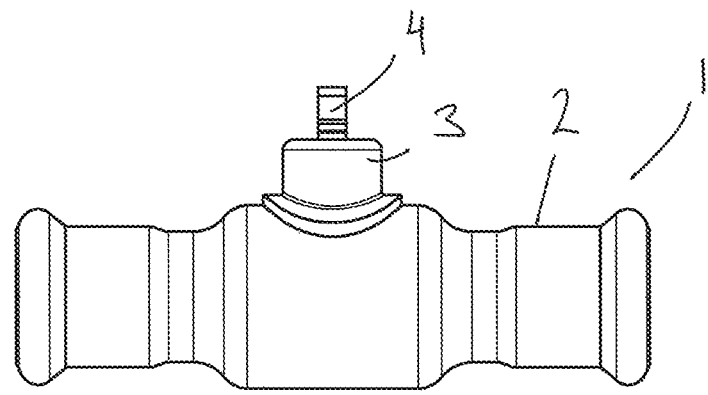
FIG. 1 shows a valve according to the invention, seen from the side.

In FIG. 1 shows a valve 1 with a valve housing 1 where the valve housing 1 has a central part and two connection ends. The two connection ends are here shown with a design adapted as so-called pressfittings. However, this is irrelevant to the invention and only an example of how these connection ends can be made. In the central part is arranged a valve body, e.g., with a through-going aperture in a valve seat. From the valve body, which is preferably constituted by a traditional ball known from various ball valves, a valve spindle 4 extends up through a spindle guide stub 3. By turning this valve spindle 4 about its longitudinal axis, the valve body can be moved between an open position and a closed position.

Figure 2:
FIG. 2 shows a tubular workpiece which is further worked into a valve housing.
Figure 3:
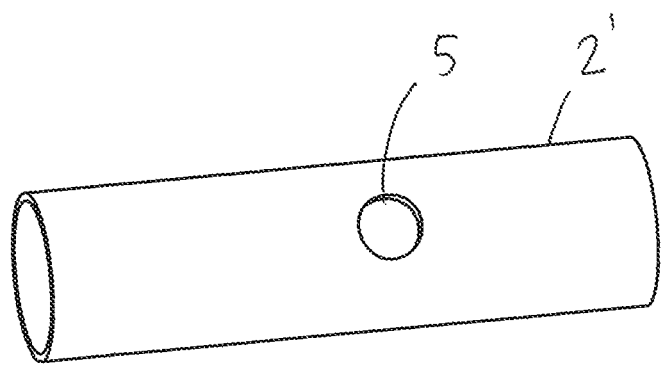
FIG. 3 shows the tubular workpiece with a cutout.

FIG. 2 shows a tubular workpiece 2' which is to be formed into a valve housing. In the tubular workpiece is formed a circular or substantially circular cutout 5, or a hole through the wall of the tubular workpiece 2' as shown on FIG. 3. The tubular workpiece 2' is then ready for mounting a spindle guide stub 3 and a valve spindle 4 before mounting the valve body and seats not shown in the tubular workpiece 2'.

The tubular workpiece 2' is, as mentioned in the introduction of the application, preferably provided by plastic deformation, such as by deep drawing, hydraulic shaping or axial shaping or a corresponding process where, e.g., a plate piece is worked by deformation into having a more or less tubular shape. Alternatively, the tubular item 2' can be provided by shortening a prefabricated tube piece with the desired dimensions.

The cutout 5 in the tubular workpiece 2' is cut in a conventional way, including e.g., by laser, ensuring that the cutout 5 is cut with very great precision.

Figures 4A, 4B, 4C:
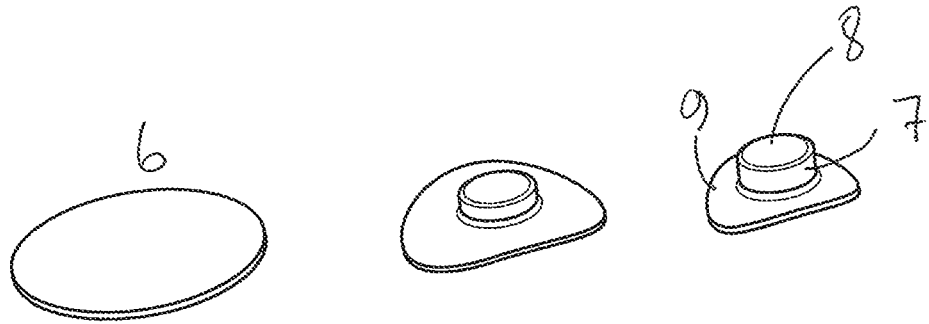
FIGS. 4a-4e show making of a spindle guide stub for the valve.

The spindle guide stub 3, itself, is formed by plastic deformation FIGS. 4a-4e of a plate-shaped workpiece 6 FIG. 4a which is preferably cut in a circular or approximately circular shape.

The spindle guide stub 3 is formed as shown in FIGS. 4b-4e with a collar 7, an upper end face 8 and a collar 9 along its lower edge. The collar 7 preferably has cylindrical or approximately cylindrical shape. The lower collar 9 has saddle shape where radius of the curvature at the bottom side thereof corresponds to radius of the circular curvature at the outer side of the wall of the tubular workpiece 2'. The shape of the collar 9 is thereby adapted to the tubular workpiece 2' on which the spindle guide stub 3 is to be mounted.

The plastic deformation of the plate-shaped workpiece 6 is preferably effected by deep drawing, hydraulic shaping or corresponding suitable conventional methods.

Figures 4D, 4E:
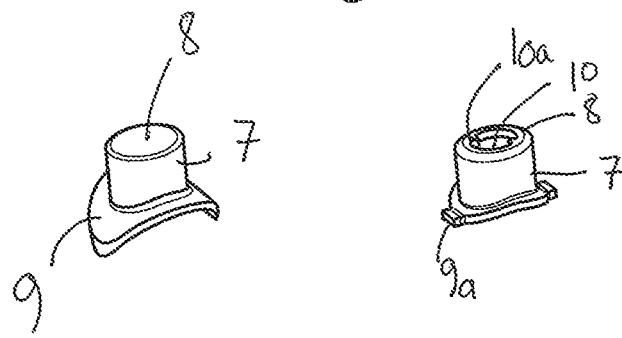

An opening 10 is then cut in the end face 8 of the spindle guide stub, see FIG. 4e.

This opening 10 includes preferably one or two projections 10a that constitute arresting faces for rotation of the valve spindle.

Then the lower collar 9 of the valve spindle is optionally cut as possibly there may be formed one or more flanges 9a along the outer edge of the collar 9.

Figure 5:
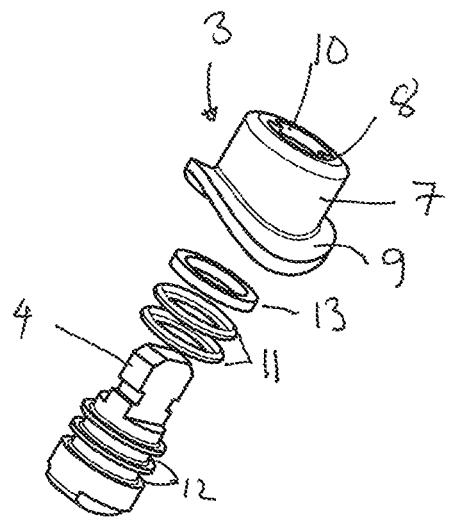
FIG. 5 shows mounting of a spindle in spindle guide stub.

The valve spindle 4 is then mounted in the spindle stub 3 as shown in FIG. 5. One or more packings 11 are disposed around the spindle 4, preferably in grooves 12 cut for the purpose in the valve spindle 4. In addition, one or more O-rings 13 can be used for positioning and/or retaining the valve spindle 4 in the spindle guide stub 3.

Figure 6:
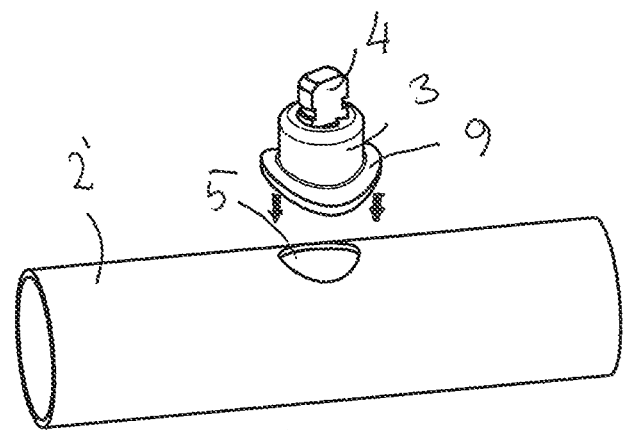
FIG. 6 shows spindle guide stub with spindle and the tubular workpiece before.
Figure 7B:
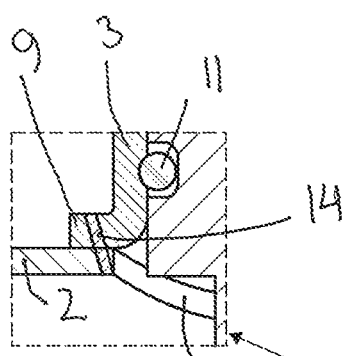
FIG. 7b shows a detail of FIG. 7a around the welding seam.
Figure 7A:
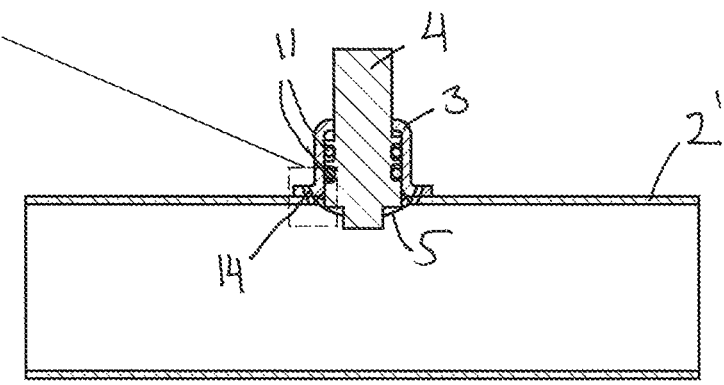
FIG. 7a shows a cross-section of the tubular workpiece with spindle guide stub welded thereon.
Figure 8:
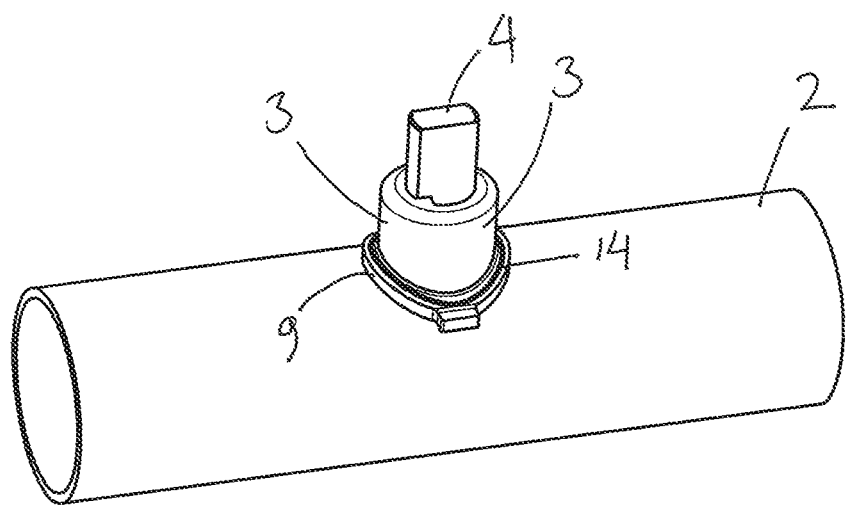
FIG. 8 shows the tubular workpiece with spindle guide stub welded thereon before shaping of the tubular workpiece into a finished valve housing.

After that, the spindle guide stub 3 is fitted with the pre-mounted valve spindle 4 on the tubular workpiece 2', as shown in FIGS. 6-8. The spindle guide stub is placed across the cutout 5 such that the valve spindle 4 projects into the tubular workpiece 2' through the cutout 5, most clearly seen in FIG. 7a showing the tube piece 2 with the mounted spindle guide stub 3 and valve spindle 4 in cross-section through the spindle guide stub.

The spindle guide stub 3 is fastened to the tube piece 2' by laser welding such that the welding beam is directed towards the joint between tube piece 2' and collar 9 of the spindle guide stub 3 from outside the collar 9. A welding robot can be applied thereby, and the welding seam 14 can be laid with great precision. FIG. 7b shows a detail in cross-section of the joint between the collar of the spindle guide stub and the area around the cutout 5 of the tube piece 2'. It appears here that the welding seam 14 is disposed close to the cutout 5. This disposition of the welding seam 14 entail that the risk of crevice corrosion or pitting arising in the joint between the outer side of the tube piece 2' and the bottom side of the collar 9 is eliminated, or at least significantly reduced.

The flanges 9a on the collar 9 of the spindle guide stub 3 may in an embodiment of the valve be used as stop for rotation of the valve spindle 4 as a handle, actuator or similar mounted on the valve spindle 4 on the finished valve can be designed such that it covers the spindle stub 3, whereby these flanges 9a on the collar 9 can function as stop for rotation of handle/actuator, and thereby also the valve spindle 4. This design entails that it becomes possible to put an external packing along the outer side of the spindle guide 4, sealing between spindle guide and handle/actuator, and thereby reducing the risk of leakage from the valve spindle compared with other valves where there are only internal packings between the inner surface of the spindle guide stub 4 and the valve spindle.

After mounting spindle guide stub 3 with the valve spindle 4 on the tubular workpiece 2', valve body, valve seats and possible packings are mounted in connection therewith as the valve spindle 4 in this connection is also fastened to the valve body. Then, the valve housing itself is shaped for forming the finished valve, see FIG. 1.

In the present application, the term "approximately" is used which includes the tolerances seen as normal by the person skilled in the art. For example, the term "approximately circular" is used, and "approximately" is here to be understood in the way that the skilled in the art visually perceives the shape as circular or substantially circular, besides including the tolerances seen as normal by the skilled in the art by possible measuring and determining the shape of the workpiece.

The invention is not limited to the above described embodiments and not to the embodiments shown in the drawings either, but may be supplemented and modified in any way according to the invention as specified and defined in the claims.

What is claimed is:

1. A method for making a valve for regulating a fluid, the valve including a valve housing with a central part and with at least one connection end, the at least one connection end extending away from the central part, wherein internally of the central part there is arranged a valve body, the valve body arranged in a valve seat and connected to a valve spindle, the valve spindle arranged in a spindle guide stub on the valve housing, wherein the making of the spindle stub at least includes the following steps:
   providing a plate-shaped workpiece;
   plastically deforming the plate-shaped workpiece to form a collar on the plate-shaped workpiece, whereby a spindle guide stub is formed as the spindle guide stub has a collar along a lower edge and a cutout in an upper surface of the spindle guide stub.

2. The method for making a valve according to claim 1, wherein the plate-shaped workpiece is planar and is provided a saddle-shape simultaneously with forming the spindle guide stub by a collar ring.

3. The method for making a valve according to claim 1, wherein a tubular workpiece is provided with a cutout in the tubular workpiece; and that the spindle guide stub is welded on the tubular workpiece by a welding running around the cutout in the tubular workpiece such that there is provided an internal welding seam running along an edge of the inner opening in the collar of the spindle guide stub and along the cutout and at an outer side of the tubular workpiece.

4. The method for making a valve according to claim 3, wherein the welding is a laser welding.

5. The method for making a valve according to claim 3, wherein the tubular workpiece is provided by deep drawing where a plate piece is worked by deformation into having a tubular shape.

6. The method for making a valve according claim 3, wherein the tubular workpiece is provided by shortening a prefabricated tube piece with desired dimensions.

7. The method for making a valve according to claim 1, wherein the valve spindle is mounted in the spindle guide stub before welding the latter on a tubular workpiece.

8. The method for making a valve according to claim 1, wherein the valve spindle is mounted in the spindle guide stub while applying one or more packings.

9. The method for making a valve according to claim 3, wherein the valve body and the valve seat are provided in the valve housing before final shaping of the ends of the tubular workpiece for forming of the ends of the valve housing.

10. A valve for regulating a fluid, the valve including a valve housing with a central part and with at least one connection end, the at least one connection end extending away from the central part, wherein internally of the central part there is arranged a valve body, the valve body arranged in a valve seat and connected to a valve spindle, the valve spindle arranged in a spindle guide stub on the valve housing, wherein the valve housing is made of a tubular workpiece, including a plastically deformed, collared spindle guide stub with a collar along a lower end and an opening at an upper end, as the spindle guide stub is welded on the tubular workpiece.

11. The valve according to claim 10, wherein the spindle guide stub is welded on the tubular workpiece by a welding, around a cutout in the tubular workpiece such that there is provided an internal welding seam running along an edge of an inner opening in the collar of the spindle guide stub and along the cutout and at an outer side of the tubular workpiece.

12. The valve including a valve housing according to claim 10, wherein the opening at the upper end of the spindle guide stub includes one or more arresting faces that limit rotation of the spindle.

13. The valve including a valve housing according to claim 10, wherein the valve housing includes at least one further collared stub.

\* \* \* \* \*